US009986111B2

(12) United States Patent
Mizutani

(10) Patent No.: US 9,986,111 B2
(45) Date of Patent: May 29, 2018

(54) MEDIUM STORING PROGRAMS EXECUTABLE BY TERMINAL APPARATUS AND TERMINAL APPARATUS

(71) Applicant: BROTHER KOGYO KABUSHIKI KAISHA, Nagoya-shi, Aichi-ken (JP)

(72) Inventor: Aiko Mizutani, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days. days.

(21) Appl. No.: 15/419,213

(22) Filed: Jan. 30, 2017

(65) Prior Publication Data

US 2017/0279983 A1 Sep. 28, 2017

(30) Foreign Application Priority Data

Mar. 25, 2016 (JP) ................. 2016-061687

(51) Int. Cl.
*G06F 3/18* (2006.01)
*H04N 1/00* (2006.01)
*G06F 3/12* (2006.01)

(52) U.S. Cl.
CPC ....... *H04N 1/00411* (2013.01); *G06F 3/1236* (2013.01); *H04N 1/00244* (2013.01); *H04N 2201/0094* (2013.01)

(58) Field of Classification Search
CPC .............. G06F 3/04845; G06F 3/0488; G06F 3/04847; G06F 3/1208; G06F 3/1256; G06F 3/1285; G06F 3/041; G06F 3/04817; G06F 3/0482; G06F 3/04842; G06F 3/04886; G06T 11/60; G06T 11/00; G06T 2210/22

USPC ....... 358/1.15, 1.18, 1.2; 345/173, 619, 620, 345/625
See application file for complete search history.

(56) References Cited

U.S. PATENT DOCUMENTS

| | | | |
|---|---|---|---|
| 9,549,084 B2 * | 1/2017 | Imahira | H04N 1/00289 |
| 2002/0021419 A1 * | 2/2002 | Yoder | G03B 21/132 353/71 |
| 2002/0054331 A1 | 5/2002 | Takenobu et al. | |
| 2004/0090679 A1 * | 5/2004 | Kowarz | H04N 9/3105 359/634 |

(Continued)

FOREIGN PATENT DOCUMENTS

| | | |
|---|---|---|
| JP | 2000-163193 A | 6/2000 |
| JP | 2002-044355 A | 2/2002 |
| JP | 2002-091425 A | 3/2002 |

*Primary Examiner* — Negussie Worku
(74) *Attorney, Agent, or Firm* — Scully, Scott, Murphy & Presser, P.C.

(57) ABSTRACT

There is provided a non-transitory computer-readable medium storing programs executable by a terminal apparatus provided with a display having a display surface and a touch sensor arranged on the display surface to detect touch operations. The programs, when executed by a processor, cause the terminal apparatus to execute: displaying an edit-target image on the display surface; display a region instruction image on the display surface, in response to a first operation on a position of the edit-target image detected by the touch sensor, the region instruction image indicating a designated region on the edit-target image; and editing the designated region of the edit-target image, in response to a change of the first operation to a second operation detected by the touch sensor.

13 Claims, 12 Drawing Sheets

(56) References Cited

U.S. PATENT DOCUMENTS

| | | | |
|---|---|---|---|
| 2012/0099129 A1* | 4/2012 | Ogino | G06F 3/04883 |
| | | | 358/1.13 |
| 2012/0113228 A1* | 5/2012 | Konno | H04N 13/0452 |
| | | | 348/47 |
| 2012/0293511 A1* | 11/2012 | Mertelmeier | A61B 6/025 |
| | | | 345/419 |
| 2013/0176246 A1* | 7/2013 | Kohigashi | G06F 3/041 |
| | | | 345/173 |
| 2013/0194311 A1* | 8/2013 | Tashima | G09G 5/38 |
| | | | 345/660 |
| 2013/0265284 A1* | 10/2013 | Yun | G06F 3/0416 |
| | | | 345/175 |
| 2014/0333718 A1* | 11/2014 | Chang | H04N 5/23222 |
| | | | 348/36 |
| 2015/0085317 A1* | 3/2015 | Kim | G06F 3/0488 |
| | | | 358/1.15 |
| 2016/0247305 A1* | 8/2016 | Borg | G06T 11/60 |
| 2017/0032556 A1* | 2/2017 | Kamiyoshihara | G06T 11/60 |
| 2017/0053427 A1* | 2/2017 | Oikawa | G06T 11/60 |

* cited by examiner

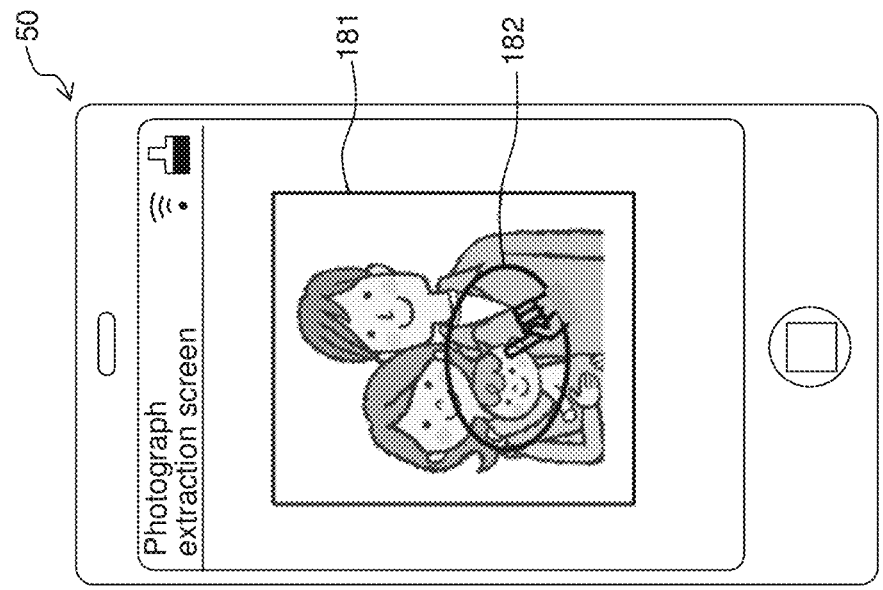
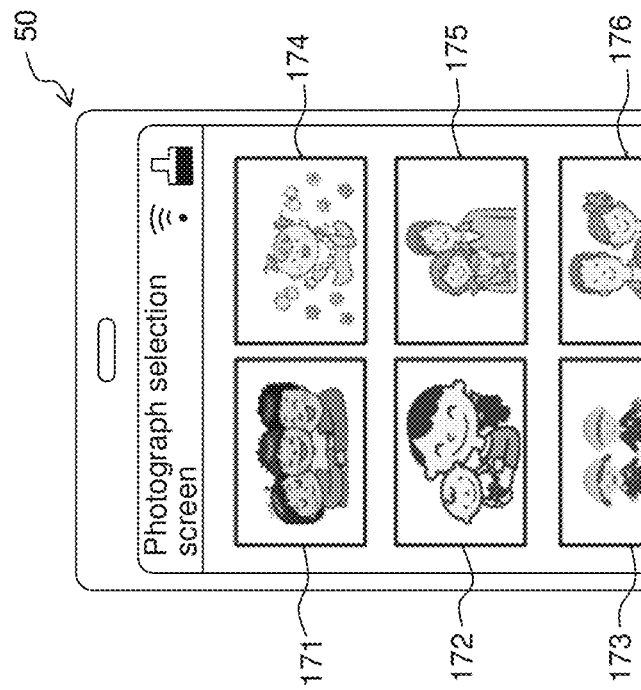

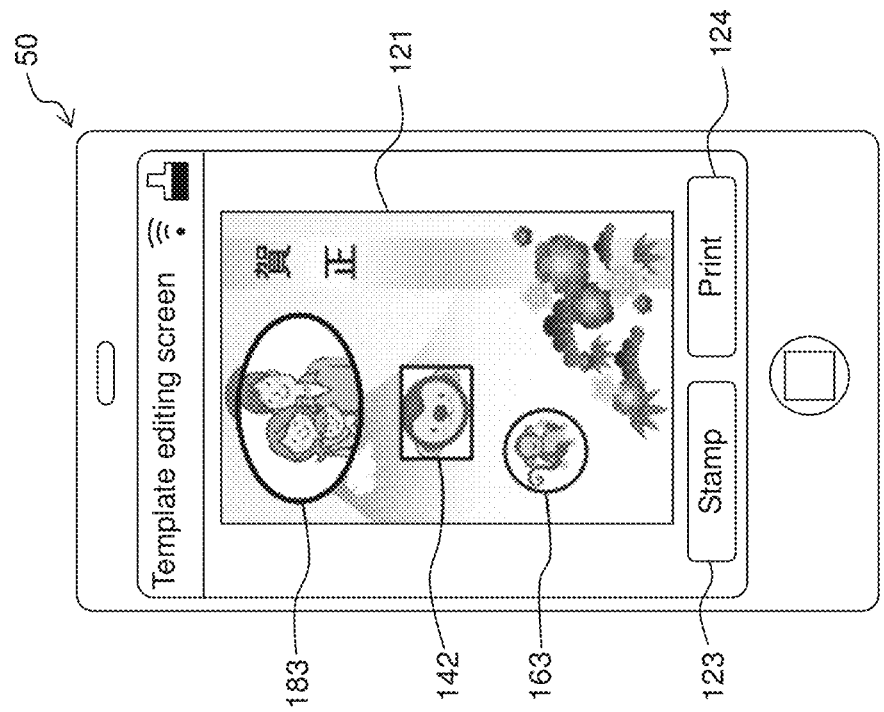
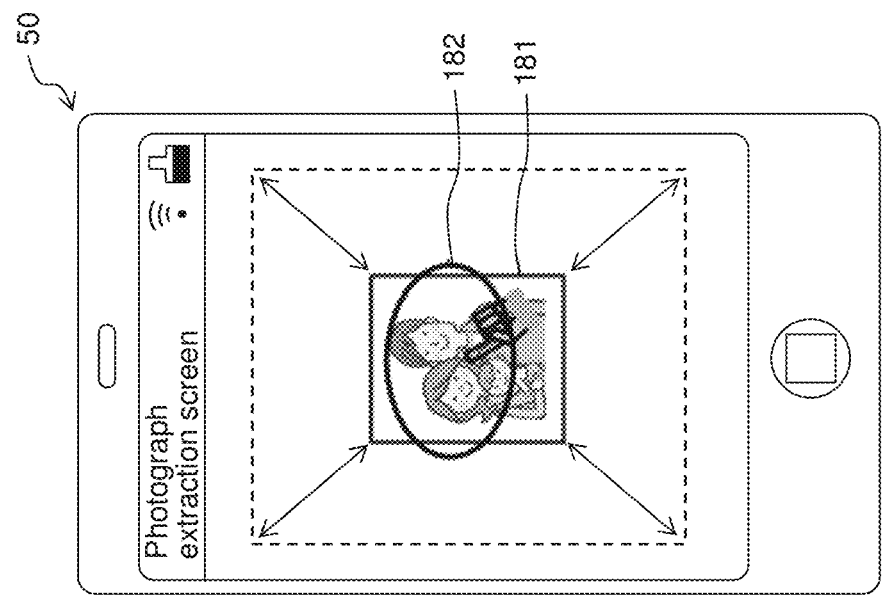

MEDIUM STORING PROGRAMS EXECUTABLE BY TERMINAL APPARATUS AND TERMINAL APPARATUS

CROSS REFERENCE TO RELATED APPLICATION

The present application claims priority from Japanese Patent Application No. 2016-061687 filed on Mar. 25, 2016, the disclosure of which is incorporated herein by reference in its entirety.

FIELD OF THE INVENTION

The present invention relates to programs for editing images to be recorded on a sheet.

DESCRIPTION OF THE RELATED ART

Conventionally, there are known systems accepting a process of editing an image to be recorded on the side of a postcard used to write messages (to be referred to below as "back side"), and recording the image (to be referred to below as "back side image") on the back side of the postcard. For example, there is known such a system that accepts a user's operation of inputting photographs, messages and the like via a communication terminal apparatus, and requests a server to record the back side image on a postcard, including the inputted photographs and messages.

SUMMARY

In the recent years, such a method is required as to easily customize the back side image according to user's favorite. Therefore, it is conceivable to arrange and edit a desired message and/or image on a prepared template image. However, if it is attempted to realize the above process on a terminal apparatus having a touch panel display, then the user is required for detailed touch operations on the screen. Therefore, such a problem arises that the user's operations for obtaining the desired image become complicated.

The present teaching is made in view of the above problem, and an object thereof is to provide a program which is installed in a terminal apparatus having a touch sensor, and which has an interface capable of editing images satisfactorily with only a few user's operations.

According to a first aspect of the present teaching, there is provided a non-transitory computer-readable medium storing programs executable by a terminal apparatus provided with a display having a display surface and a touch sensor arranged on the display surface to detect touch operations, the programs, when executed by a processor, causing the terminal apparatus to execute:

displaying an edit-target image on the display surface;
displaying a region instruction image on the display surface while superimposing the region instruction image on the edit-target image, in response to a first operation on a position of the edit-target image detected by the touch sensor, the region instruction image indicating a designated region on the edit-target image; and
editing the designated region of the edit-target image, in response to a change of the first operation to a second operation detected by the touch sensor.

According to a second aspect of the present teaching, there is provided a terminal apparatus including:
a display having a display surface;
a touch sensor arranged on the display surface to detect touch operations; and
a controller,
wherein the controller is configured to execute:
displaying an edit-target image on the display surface;
displaying a region instruction image on the display surface while superimposing the region instruction image on the edit-target image, in response to a first operation on a position of the edit-target image detected by the touch sensor, the region instruction image indicating a designated region on the edit-target image; and
editing the designated region of the edit-target image, in response to a change of the first operation to a second operation detected by the touch sensor.

According to the above configuration, the first operation leads to displaying the region instruction image superimposed on the edit-target image, while the second operation leads to editing the designated region of the edit-target image. By virtue of this, it is possible for the terminal apparatus having the touch sensor to realize editing a desired position in the edit-target image with only a few user's operations.

BRIEF DESCRIPTION OF THE DRAWINGS

FIG. 11A depicts a photograph selection screen,
and FIG. 11B depicts a photograph extraction screen.
FIG. 12A depicts the photograph extraction screen where a photograph image is periodically expanded and contracted,
and FIG. 12B depicts the template editing screen where the stamp images and the photograph image are combined into the template image.

DESCRIPTION OF THE EMBODIMENT

Referring to the accompanying drawings as appropriate, an embodiment of the present teaching will be explained below. Further, it is needless to say that the embodiment explained below is merely one example of the present teaching, and it is possible to appropriately change the embodiment of the present teaching without departing from the true spirit and scope of the present teaching. For example, it is possible to appropriately change the order of carrying out aftermentioned respective processes without departing from the true spirit and scope of the present teaching.

Figure 1:
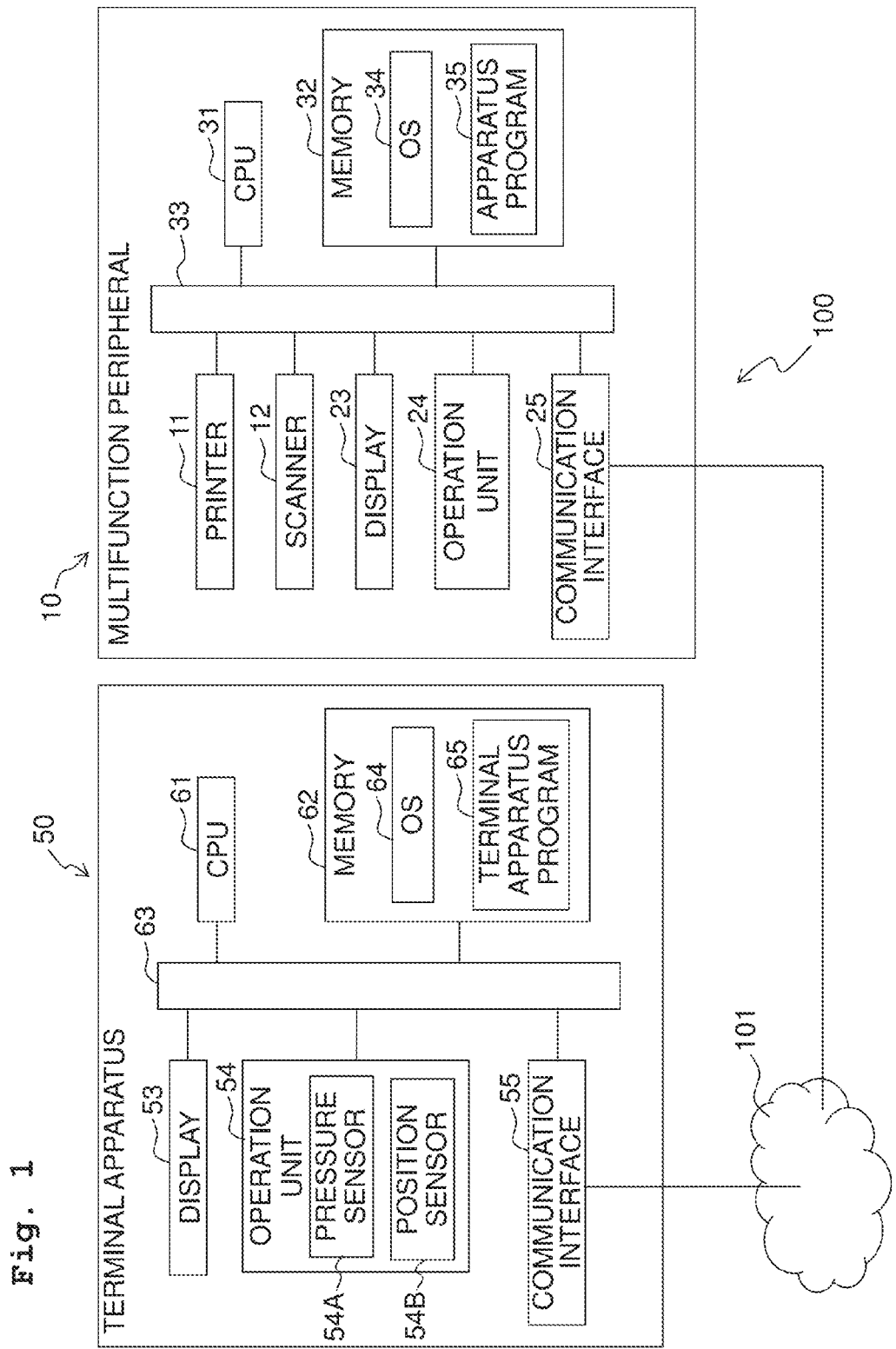
FIG. 1 is a block diagram of a multifunction peripheral and a terminal apparatus constituting a system according to an embodiment of the present teaching.

As depicted in FIG. 1, a system 100 according to this embodiment is constructed from a multifunction peripheral 10 and a terminal apparatus 50. Further, the system 100 may include a monofunctional printer or a server instead of the multifunction peripheral 10. The multifunction peripheral 10 and the terminal apparatus 50 are configured to be able to communicate with each other via a communication network 101. The communication network 101 may be, for example, a wired LAN, a wireless LAN, or a combination thereof.

As depicted in FIG. 1, the multifunction peripheral 10 mainly includes a printer 11, a scanner 12, a display 23, an operation unit 24, a communication interface 25, a CPU 31, a memory 32, and a communication bus 33. The respective components constituting the multifunction peripheral 10 are connected with each other via the communication bus 33. The multifunction peripheral 10 is an example of the image recording apparatus.

The printer 11 carries out a print operation to record an image represented by image data on a sheet. As a recording method of the printer 11, it is possible to adopt a publicly known method such as an ink jet method, an electrophotographic method, or the like. The scanner 12 carries out a scan operation to read the image recorded on a manuscript to generate image data.

The display 23 is a liquid crystal display, an organic EL display or the like which includes a display surface to display various information.

The operation unit 24 is a user interface to accept user's input operations. In particular, the operation unit 24 has buttons and outputs to the CPU 31 various operation signals corresponding respectively to the pressed buttons. Further, the operation unit 24 may have a film-like touch sensor overlaid on the display surface of the display 23. The operation designating an object displayed on the display surface of the display 23 and the operation inputting character strings or number strings are an example of the user operation. The term "object" refers to, for example, a character string, icon, button, link, radio button, check box, pull-down menu, or the like which is displayed on the display 23.

The operation unit 24 realized as a touch sensor outputs positional information indicating a position on the display surface touched by the user. Further, the term "touch" used in this specification includes all operations causing an input medium to contact with the display surface. Further, the abovementioned concept of "touch" may also include "hover" or "floating touch" which causes the input medium to approach such a position that the distance between the input medium and the display surface is extremely short, without the need for the input medium to contact with the display surface. Further, the input medium may refer to a finger of the user, a touch pen, or the like. The user's operation of tapping the position of an icon displayed on the display 23 is an example of the designating operation to designate that icon.

The communication interface 25 is an interface for carrying out communications with external devices via the communication network 101. That is, the multifunction peripheral 10 sends various information to the terminal apparatus 50 via the communication interface 25 and receives various data or various information from the terminal apparatus 50 via the communication interface 25. While the communication interface 25 is not limited particularly to any specific communication procedure, it is possible, for example, to adopt Wi-Fi (the registered trademark of Wi-Fi Alliance). However, the communication interface 25 is not limited to the above particular example, but may be, for example, an interface or the like which can be installed or removed with a LAN cable or a USB cable.

The CPU 31 controls the overall operation of the multifunction peripheral 10. The CPU 31 acquires aftermentioned various programs from the memory 32 and executes the same based on various signals outputted from the operation unit 24 and various information acquired from external devices via the communication interface 25. That is, the CPU 31 and the memory 32 establish one example of a controller.

The memory 32 stores an OS 34 and an apparatus program 35. Further, the apparatus program 35 may be either a single program or a collection of a plurality of programs. Further, the memory 32 stores data or information needed for executing the apparatus program 35. The memory 32 is constructed of, for example, a RAM, ROM, EEPROM, HDD, a portable storage medium such as a USB memory or the like removable from the multifunction peripheral 10, a buffer or the like included in the CPU 31, or a combination thereof.

The memory 32 may also be a computer readable storage medium. A computer readable storage medium is a non-transitory medium. A non-transitory medium includes other recording media such as a CD-ROM, DVD-ROM, or the like, in addition to the above examples. Further, a non-transitory medium is also a tangible medium. On the other hand, while electrical signals carrying programs downloaded from a server or the like on the Internet are computer readable signal media which are a sort of computer readable media, they are not included in the non-transitory computer readable storage media. Much the same is true on an aftermentioned memory 62 of the terminal apparatus 50.

As depicted in FIG. 1, the terminal apparatus 50 includes, mainly, a display 53, an operation unit 54, a communication interface 55, a CPU 61, a memory 62, and a communication bus 63. Because the display 53, the communication interface 55, the CPU 61, the memory 62 and the communication bus 63 included in the terminal apparatus 50 have the same configuration respectively as the display 23, the communication interface 25, the CPU 31, the memory 32 and the communication bus 33 included in the multifunction peripheral 10, explanations therefor are omitted here. The CPU 61 and the memory 62 also establish one example of the controller. While the terminal apparatus 50 is not limited particularly to any specific example, it may be, for example, a cellphone, a smartphone, a tablet terminal, a PC, or the like.

The display 53 includes a display surface to display various screens. The display surface may refer to, for example, a plate-like transparent member (such as a glass plate or the like) exposed at the surface of the terminal apparatus 50. The phrase "display various screens on the display surface" refers to such a state, for example, that the user can view the screens displayed by the display 53 via the display surface.

The operation unit 54 is an input interface to accept various operations of the user. The operation unit 54 according to this embodiment has a pressure sensor 54A and a position sensor 54B which are film-like members superimposed on the display surface of the display 53. That is, the display 53 is constructed as a touch panel display. The pressure sensor 54A and the position sensor 54B are one example of touch sensors to output operation signals according to touch operations on the glass plate exposed on the surface of the terminal apparatus 50, that is, the display surface of the display 53.

The pressure sensor 54A outputs to the CPU 61 a pressure signal corresponding to pressure applied to the display surface by an input medium. The pressure sensor 54A outputs a first pressure signal in response to such an event that the display surface is pressed by pressing force less than a first pressure. Further, the pressure sensor 54A outputs a second pressure signal in response to such an event that the display surface is pressed by pressing force less than a second pressure but not less than the first pressure. Further, the pressure sensor 54A outputs a third pressure signal in response to such an event that the display surface is pressed by pressing force not less than the second pressure. Further, the second pressure is larger than the first pressure. Alternatively, the pressure sensor 54A may output to the CPU 61 a pressure signal indicating a pressure value applied to the display surface. In this case, the CPU 61 compares the pressure value indicated by the pressure signal with threshold values.

The position sensor 54B outputs to the CPU 61 a position signal to correspond to a position on the display surface to which pressure is applied by the input medium. The position signal indicates, for example, the coordinates (x, y) on the x-y plane with the upper left end of the display surface as the origin, with the rightward direction as the positive direction on the x-axis, and the downward direction as the positive direction on the y-axis. Further, the position sensor 54B repeatedly outputs the position signal per predetermined detection period (for example, 10 milliseconds) when a touch operation is continued on the display surface.

Further, the term "touch" in this specification includes every operation causing the input medium to contact with the display surface. That is, the aforementioned tap operation, aftermentioned peek operation, pop operation, slide operation, and flick operation, as well as long touch operation, pinch-in operation, pinch-out operation and the like are examples of the touch operation. The peek operation is one example of the first operation while the pop operation is one example of the second operation.

In more detail, the operation unit 54 detects a tap operation carried out on a position indicated by the position signal outputted from the position sensor 54B, in accordance with such an event that the first pressure signal has been outputted from the pressure sensor 54A. The operation unit 54 detects a peek operation carried out on a position indicated by the position signal outputted from the position sensor 54B, in accordance with such an event that the second pressure signal has been outputted from the pressure sensor 54A. The operation unit 54 detects a pop operation carried out on a position indicated by the position signal outputted from the position sensor 54B, in accordance with such an event that the third pressure signal has been outputted from the pressure sensor 54A. The operation unit 54 detects a slide operation or a flick operation carried out, in accordance with such an event that there has been a continuous change of the position indicated by the position signal outputted from the position sensor 54B.

Referring to FIGS. 2 to 5, operations of the system 100 according to this embodiment will be explained. In this embodiment, the explanation will be made on an example of a back side editing process to edit an image recorded on the back side of a New Year's card. However, the image which is the object or target to edit is not limited to an image recorded on the back side of a New Year's card.

The flowcharts in this specification basically depict the processes of the CPUs 31 and 61 following the commands described in a computer program. That is, the processes of "determine", "extract", "select", "calculate", "specify", "control" and the like in the following explanation refer to the processes of the CPUs 31 and 61. The process with the CPU 61 includes a hardware control via an OS 64. Further, the "data" in this specification are in the form of computer readable bit strings. Then, any data having the same meaning in effect but having different formats are treated as the same data. Much the same is true on the "information" in this specification.

<Back Side Editing Process>

Figure 6B:
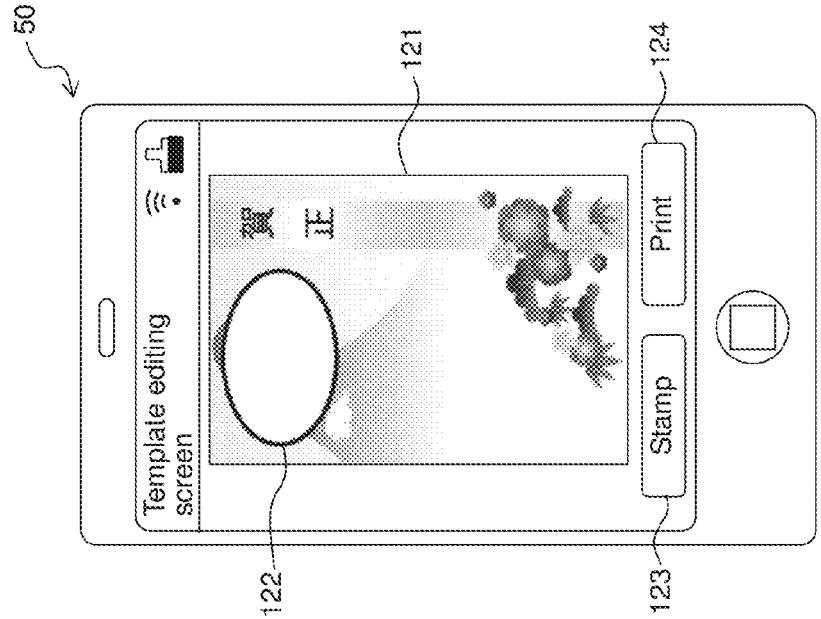
FIG. 6B depicts a template editing screen.
Figure 6A:
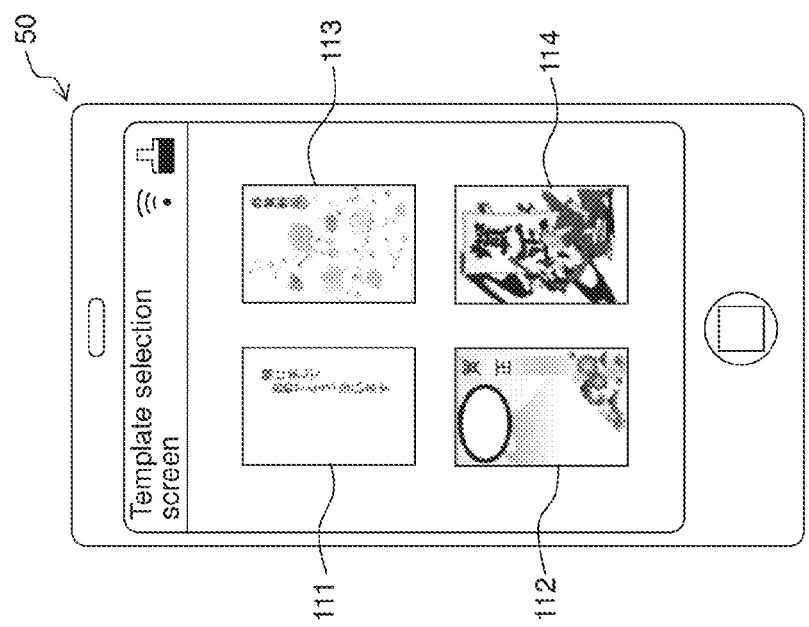
FIG. 6A depicts a template selection screen.

First, a terminal apparatus program 65 for the terminal apparatus 50 causes the display 53 to display a template selection screen depicted in FIG. 6A (S11). The template selection screen includes template icons 111, 112, 113 and 114. The template icons 111 to 114 correspond to the template image data stored in the memory 62 or an undepicted server. The template image data according to this embodiment represent the template images recorded on the back side of a New Year's card. Then, the terminal apparatus program 65 accepts the user's operation on the template selection screen via the operation unit 54 (S12).

Next, from the memory 62 or the undepicted server, the terminal apparatus program 65 acquires the template image data corresponding to the tapped template icon, in accordance with such an event, for example, that the operation unit 54 has detected a tap operation on the position of the template icon 112 (S12: Yes). The template image represented by the acquired template image data is an example of the edit-target image. Further, the template image 121 according to this embodiment includes a photograph frame image 122 as depicted in FIG. 6B. The photograph frame image 122 depicts a photograph area for combining a photograph in an aftermentioned photograph combine process. However, the template image may not include any photograph frame image.

Next, the terminal apparatus program 65 divides the template image 121 represented by the acquired template image data into a foreground area and a background area (S13). The foreground area refers to, for example, an area depicting characters, pictures or the like in the template image 121. The background area refers to, for example, an area depicting the background, that is, the area other than the foreground area. In this embodiment, in the template image 121 depicted in FIG. 7B, the hatched area is sorted into the foreground area while the other area is sorted into the background area.

The terminal apparatus program 65 may change the template image 121 in terms of frequency in, for example, the step S13. Then, the terminal apparatus program 65 may sort, into the foreground area, the area whose frequency is not less than a threshold value, in other words, the area whose change in pixel value is relatively larger. On the other hand, the terminal apparatus program 65 may sort, into the background area, the area whose frequency is less than the threshold value, in other words, the area whose change in pixel value is relatively smaller. However, the method of specifying the foreground and the background is not limited to the example described above.

As an example, the terminal apparatus program 65 may specify the mode of the histogram of the pixel value constituting the template image 121, and sort the area set with the pixel value of a predetermined range including the specified mode into the background area. As another example, the terminal apparatus program 65 may use OCR to extract the characters from the template image 121 and sort an area including the extracted characters into the foreground area. As still another example, the foreground area and the background area may be represented by metadata associated with the template image data.

Next, the terminal apparatus program 65 causes the display 53 to display the template editing screen depicted in FIG. 6B (S14). The template editing screen serves to urge editing of the template image represented by the template image data acquired in S12. The template editing screen includes the template image 121 with the superimposed photograph frame image 122, a "Stamp" icon 123, and a "Print" icon 124. The "Stamp" icon 123 corresponds to the instruction of combining a stamp image on the template image 121. The "Print" icon 124 corresponds to the instruction of carrying out a print operation to record the template image 121 on the back side of the New Year's card. The process of S14 is one example of the first display process. Then, the terminal apparatus program 65 accepts the user's operation on the template editing screen via the operation unit 54 (S15).

Figure 3:
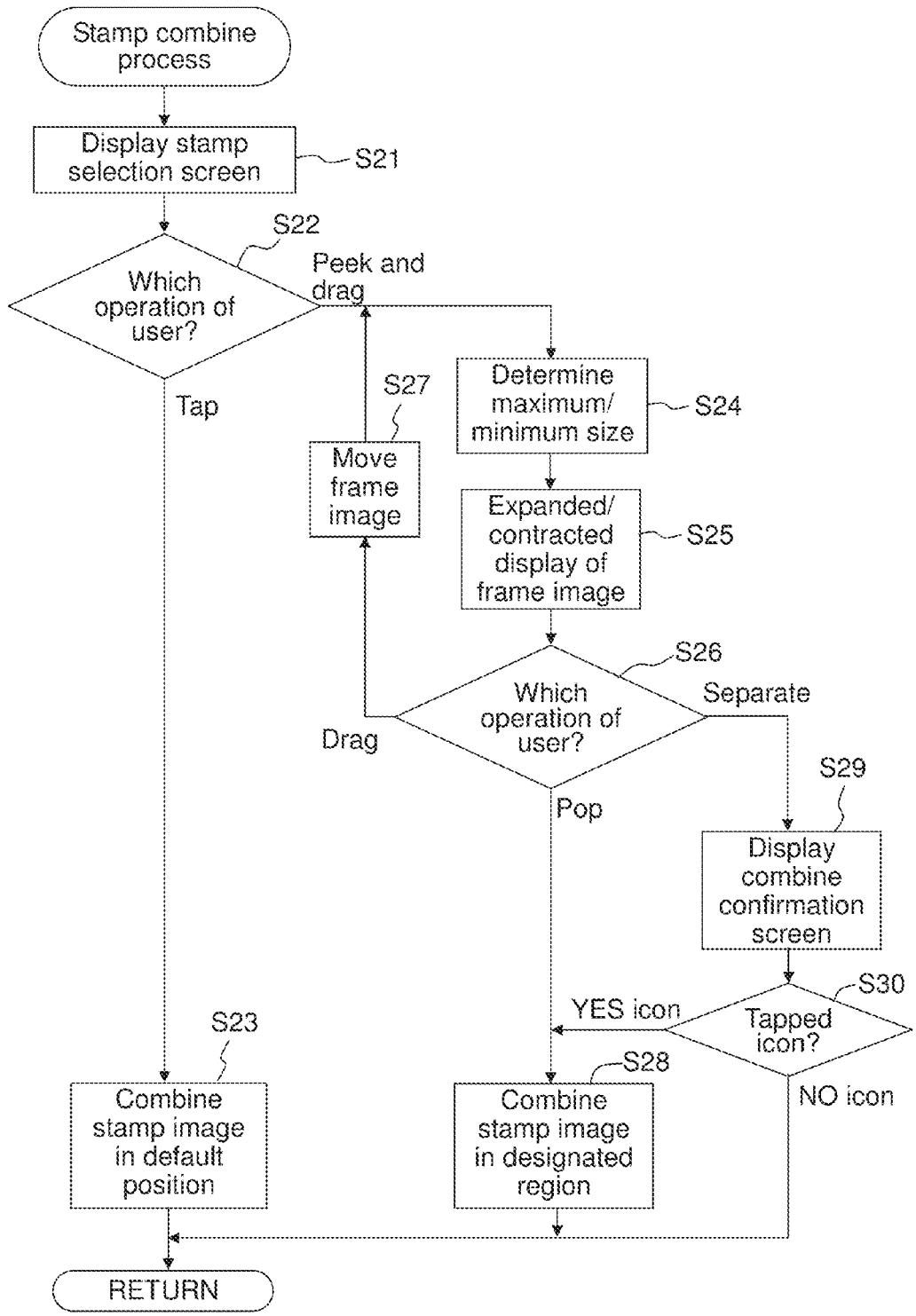
FIG. 3 is a flowchart of a stamp combine process.

Next, the terminal apparatus program 65 carries out a stamp combine process (S16) in accordance with such an event that the operation unit 54 has detected a tap operation on the position of the "Stamp" icon 123 (S15: Stamp icon). The stamp combine process serves to combine a user designated stamp image on the template image 121 at a user designated position. Referring to FIG. 3, the stamp combine process will be explained below in detail.

<Stamp Combine Process>

Figure 7A:
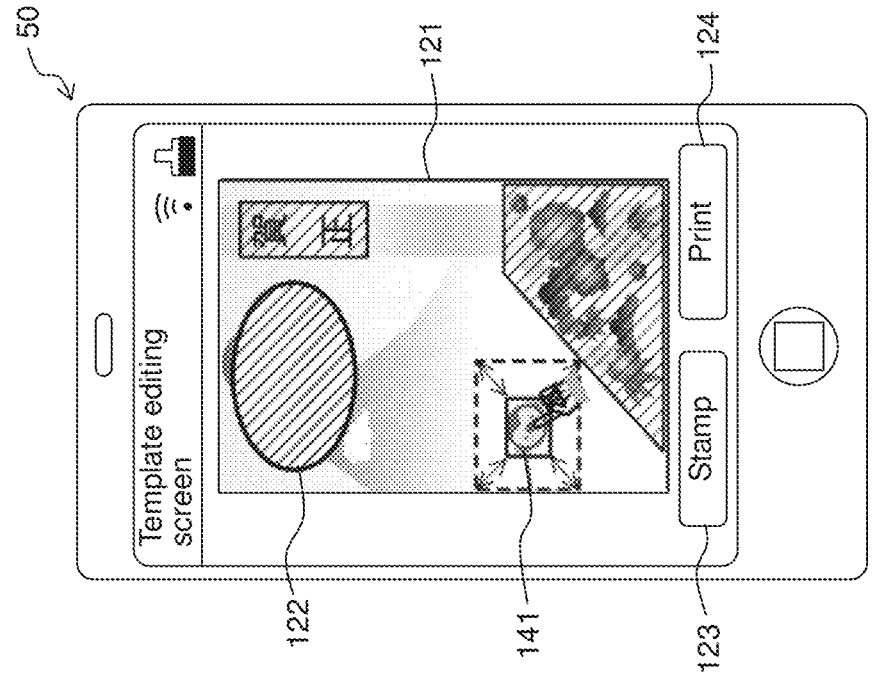
FIG. 7A depicts a stamp selection screen superimposed on a part of the template editing screen.

First, the terminal apparatus program 65 causes the display 53 to display a stamp selection screen depicted in FIG. 7A (S21). The stamp selection screen according to this embodiment is a popup window displayed as superimposed on a part of the template editing screen. That is, the template editing screen depicted in FIG. 7A includes an area with the superimposed stamp selection screen and an area without the superimposed stamp selection screen. The process of S21 is one example of the fourth display process. Then, the terminal apparatus program 65 accepts the user's operation on the stamp selection screen via the operation unit 54 (S22).

The stamp selection screen serves to urge selection of a stamp image to be superimposed on the template image 121. The stamp selection screen includes stamp icons 131, 132, 133 and 134. The stamp icons 131 to 134 correspond to stamp image data stored in the memory 62 or the undepicted server. The stamp image data represent the stamp images combinable into the template image 121. The memory 62 or the undepicted server has stored the plurality of stamp image data representing the stamp images in different contour shapes (such as rectangle, triangle, circle, ellipse, and the like). The stamp images are one example of small images while the stamp selection screen is one example of list screens including a list of the small images.

Next, the terminal apparatus program 65 acquires, from the memory 62 or the undepicted server, the stamp image data corresponding to a tapped stamp icon 134, in accordance with such an event that the operation unit 54 has detected a tap operation on the position of the stamp icon 134 (S22: Tap). Then, the terminal apparatus program 65 hides the stamp selection screen and combines the stamp image represented by the acquired stamp image data at a default size in a default position on the template image 121 (S23). For example, the default position may be prestored in the memory 62 while the default size may be predetermined for each stamp image. Then, the terminal apparatus program 65 sorts the combined stamp image into the foreground area (S13) and causes the display 53 to display the template image 121 with the combined stamp image (S14).

On the other hand, the terminal apparatus program 65 acquires, from the memory 62 or the undepicted server, the stamp image data corresponding to the peeked stamp icon 134 in accordance with such an event that the operation unit 54 has detected a peek operation on the position of the stamp icon 134. The stamp image data corresponding to the stamp icon 134 represents a stamp image in a rectangular contour shape. Further, in accordance with such an event that the operation unit 54 has detected the input medium having moved in the peek operation (that is, a drag operation), the terminal apparatus program 65 moves the display position of the stamp icon 134 following the input medium.

In this embodiment, the subsequent processes will be explained on the premise of the input medium having moved downward from the position of the stamp icon 134 in FIG. 7A. Then, the terminal apparatus program 65 determines the maximum size and the minimum size for a frame image 141 depicted in FIG. 7B (S24) in accordance with such an event that the operation unit 54 has detected the input medium in the peek operation having moved out of the stamp selection screen (S22: Peek and drag). The process of S24 is one example of the size determination process.

The frame image 141 is one example of a region instruction image indicating the position, shape and area of the region to combine the stamp image (to be referred to below as "designated region") on the template image 121. The frame image 141 is a frame type image corresponding to the contour shape of the stamp image selected via the stamp selection screen. In other words, the frame image 141 is a frame type image surrounding the stamp image. The frame image 141 and the stamp image are identical in aspect ratio (that is, in shape).

The maximum size refers to, for example, the size for the frame image 141 to first contact with the foreground area when the frame image 141 is expanded centered at the touch position of the input medium in the peek operation. The minimum size may be, for example, either predetermined to be common to all stamp images or predetermined for each selected stamp image. When acquiring stamp image data, for example, the terminal apparatus program 65 may acquire the minimum size corresponding to the stamp image data.

Further, the phrase "expand or contract the frame image 141" refers to increasing or decreasing the area of the frame image 141 while keeping the aspect ratio of the frame image 141 (that is, the shape) as it is. That is, the frame image 141 at the maximum size and the frame image 141 at the minimum size are identical in shape to the stamp image combined in the designated region indicated by the frame image 141. Much the same is true on expanding and contracting other frame images 161, 162 and 182 and a photograph image 181 which will all be described later on.

Figure 7B:
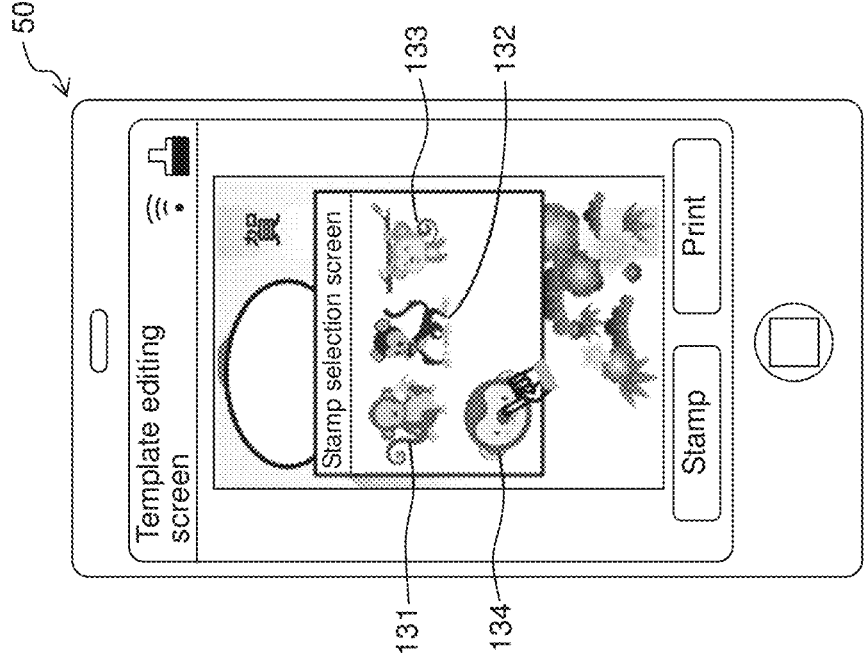
FIG. 7B depicts the template editing screen in which a frame image is displayed.

Next, as depicted in FIG. 7B, the terminal apparatus program 65 hides the stamp selection screen and displays the frame image 141 superimposed on the template image 121 (S25) such that the touch position of the input medium in the peek operation may coincide with the barycentric position of the frame image 141. Further, in the frame image 141 depicted in FIG. 7B, although the stamp image is displayed inside, only such a frame may also be suffice as to correspond to the contour shape of the stamp image. The process of S25 is one example of the second display process.

Further, the terminal apparatus program 65 periodically expands and contracts the frame image 141 displayed as superimposed on the template image 121, between the maximum size and the minimum size of the frame image 141 determined in S25. That is, for example, the frame image 141 is expanded gradually while keeping the aspect ratio until reaching the maximum size depicted with the dashed line in FIG. 7B. After the maximum size is reached, the frame image 141 is contracted gradually while keeping the aspect ratio. Then, after the minimum size is reached, the frame image 141 is expanded gradually again. This process is one example of the process to change, over the passage of time, at least one of the area and the shape of the designated region indicated by the frame image 141. Further, the stamp image displayed inside the frame image 141 may be either expanded and contracted at the same ratio as the frame image 141 along with the expansion and contraction of the frame image 141 or kept at the minimum size of the frame image 141.

Figure 8B:
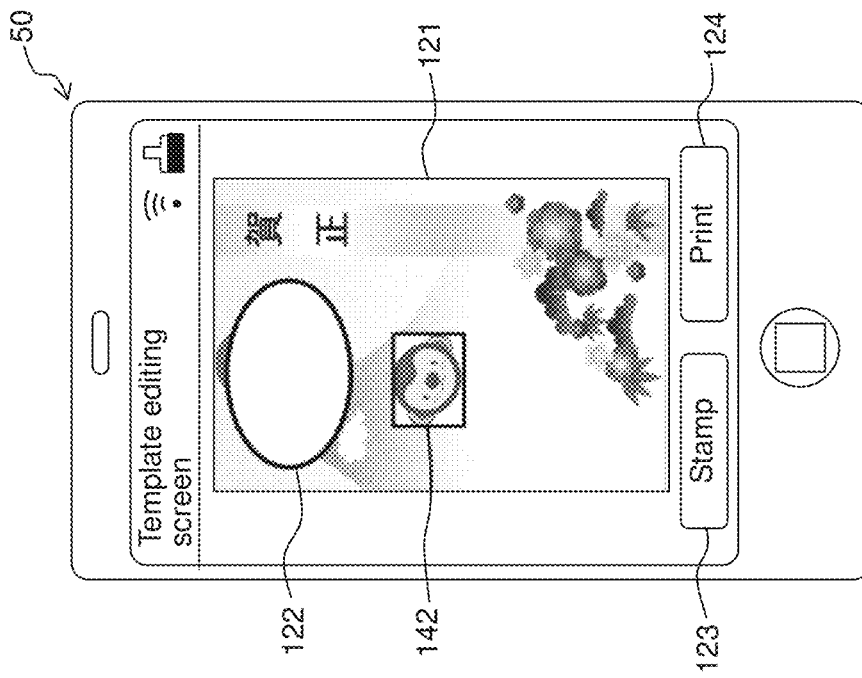
FIG. 8B depicts the template editing screen where a stamp image is combined into a template image.
Figure 8A:
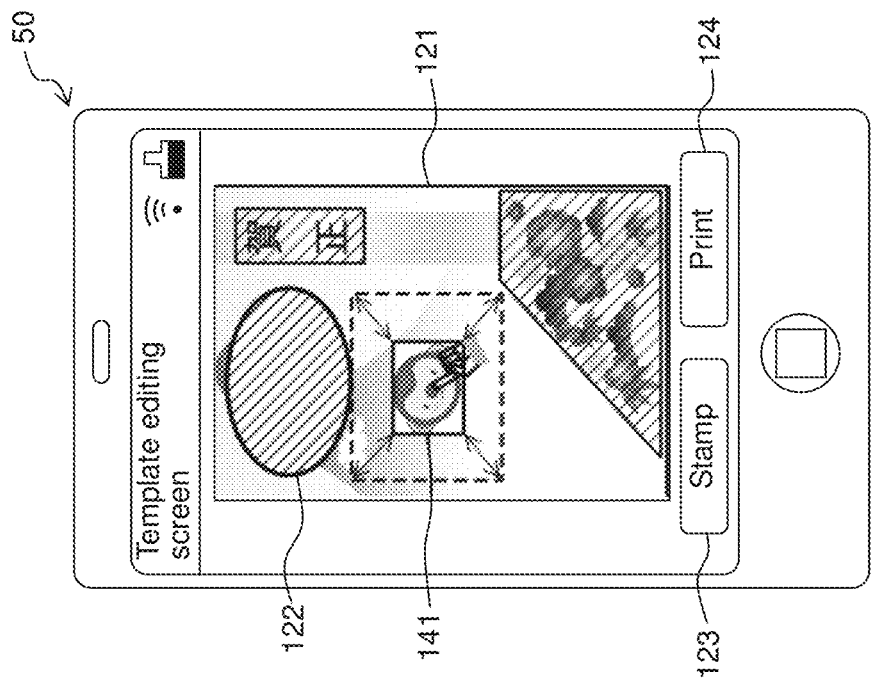
FIG. 8A depicts the template editing screen where the frame image is moved from a position depicted in FIG. 7B.

Next, the terminal apparatus program 65 moves the display position of the frame image 141 following the input medium as depicted in FIG. 8A (S27) in accordance with such an event that the operation unit 54 has detected the input medium in the peek operation having moved on the display surface (S26: Drag). Further, the stamp image displayed inside the frame image 141 is moved in the same direction through the same distance, along with the moving of the frame image 141. The process of S27 is one example of the moving process. Then, the terminal apparatus program 65 determines the maximum size and the minimum size of the frame image 141 at the touch position of the moved input medium, and periodically expands and contracts the frame image 141 between the maximum size and the minimum size (S24 and S25).

Next, the terminal apparatus program 65 expands or contracts the stamp image 142 represented by the stamp image data acquired in S22 to the present area of the frame image 141, so as to combine the same at the present position of the frame image 141 on the template image 121 (S28), in accordance with such an event that the operation unit 54 has detected the peek operation detected in S22 having changed to a pop operation (S26: Pop). The process of S28 is one example of the editing process and the combine process. Then, the terminal apparatus program 65 sorts the combined stamp image 142 into the foreground area (S13) and, as depicted in FIG. 8B, causes the display 53 to display the template image 121 with the combined stamp image 142 (S14). That is, the frame image 141 depicted in FIG. 8A is hidden while the stamp image 142 depicted in FIG. 8B is displayed as superimposed on the template image 121 at the position of the frame image 141.

Figure 9A:
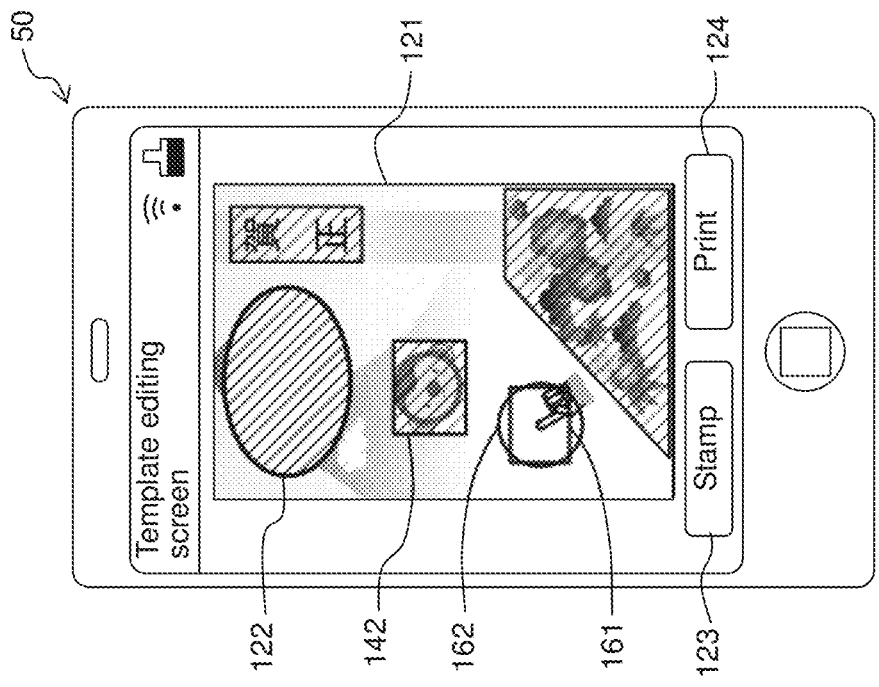
FIG. 9A depicts a combine confirmation screen superimposed on the template editing screen.

On the other hand, the terminal apparatus program 65 causes the display 53 to display a combine confirmation screen depicted in FIG. 9A (S29) in accordance with such an event that the operation unit 54 has detected the input medium in the peek operation having separated from the display surface (S26: Separate). The combine confirmation screen according to this embodiment is a popup window displayed as superimposed on part of the template editing screen. The combine confirmation screen is one example of the screen inquiring the user whether or not to carry out the editing process (S28). The combine confirmation screen includes a message "Combine the stamp?", a "YES" icon 151, and a "NO" icon 152. Then, the terminal apparatus program 65 accepts the user's operation on the combine confirmation screen via the operation unit 54 (S30).

Figure 2:
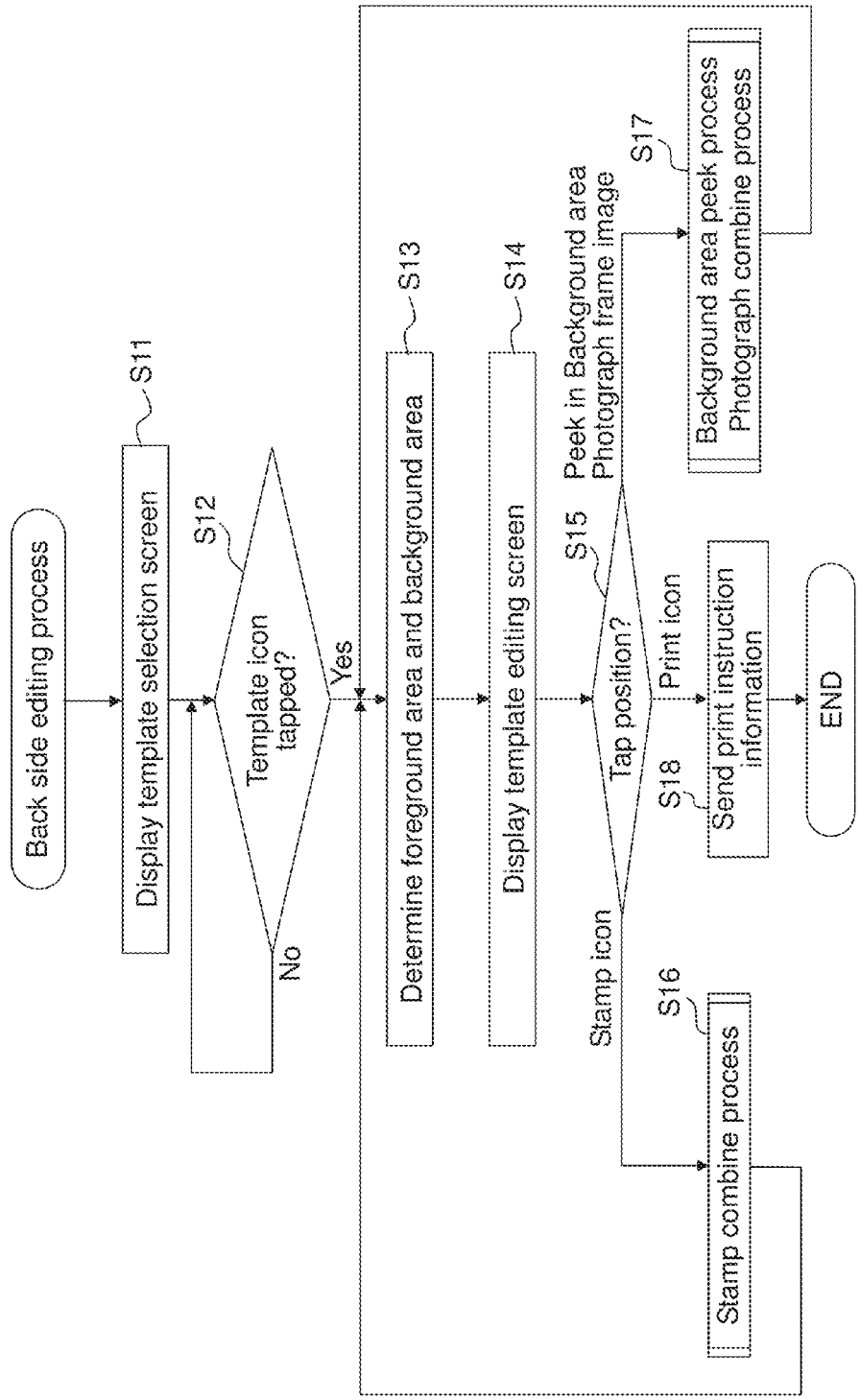
FIG. 2 is a flowchart of a back side editing process.

Then, the terminal apparatus program 65 carries out the process of S28 and the processes from S13 of FIG. 2 in accordance with such an event that the operation unit 54 has detected a tap operation on the position of the "YES" icon 151 (S30: YES icon). On the other hand, the terminal apparatus program 65 carries out the processes from S13 of FIG. 2 without carrying out the process of S28 in accordance with such an event that the operation unit 54 has detected a tap operation on the position of the "NO" icon 152 (S30: NO icon). The processes of S29 and S30 are one example of the inquiry process. The tap operation on the position of the "YES" icon 151 is one example of the touch operation corresponding to the instruction of carrying out the editing process.

Figure 4:
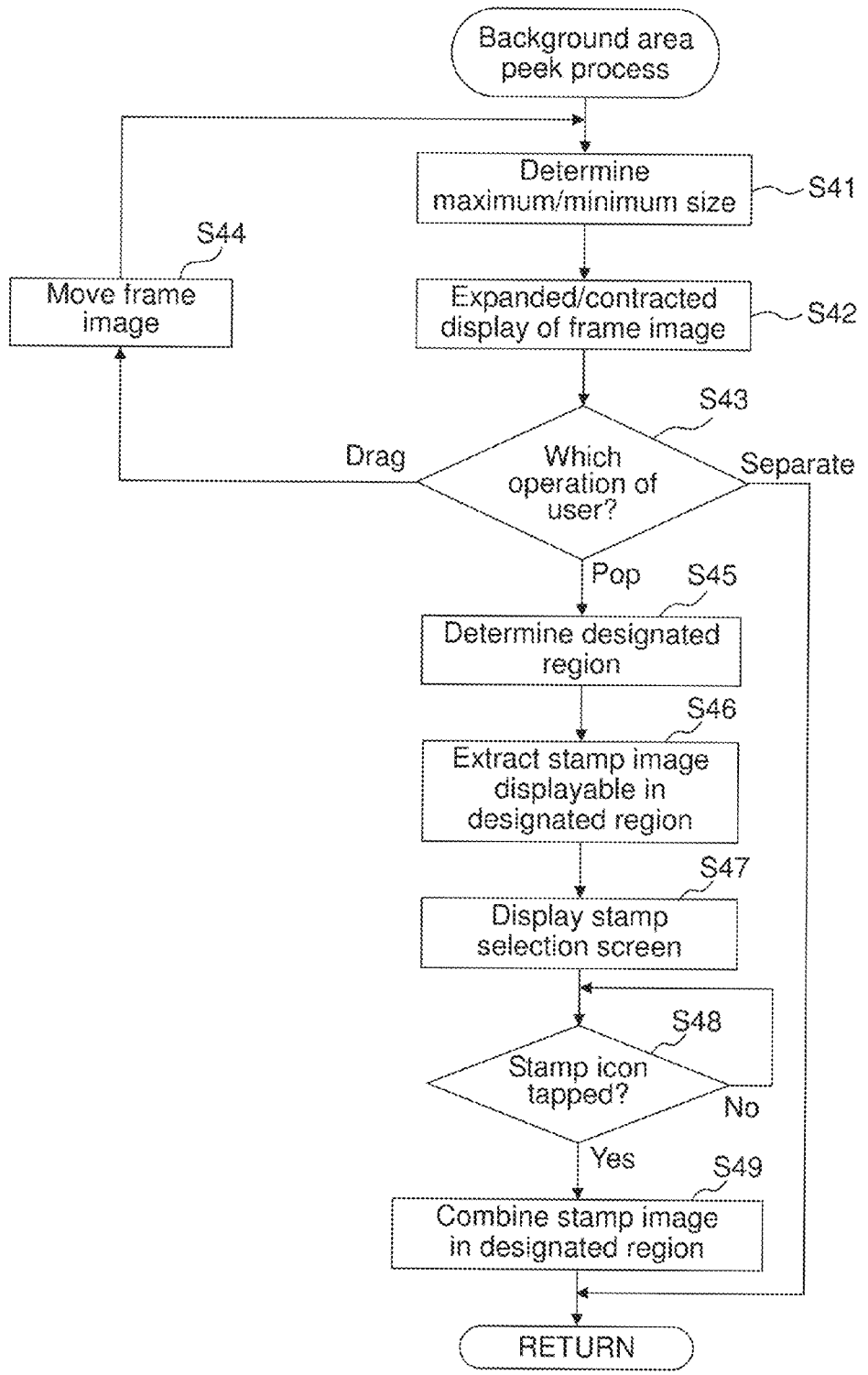
FIG. 4 is a flowchart of a background area peek process.

Retuning to FIG. 2, the flowchart depicts that the terminal apparatus program 65 carries out a background area peek process (S17) in accordance with such an event that the operation unit 54 has detected a peek operation on the background area of FIG. 8B (S15: Peek in the background area). The background area peek process serves to combine the stamp image designated by the user at the position designated by the user on the template image 121. Referring to FIG. 4, the background area peek process will be explained in detail. However, while any detailed explanation is omitted for the aspects common to the stamp combine process, the explanation will focus on different aspects.

<The Background Area Peek Process>

First, the terminal apparatus program 65 determines the maximum sizes and the minimum sizes respectively for a plurality of frame images corresponding to the contour shapes of the selectable stamp images (S41). In this embodiment, the maximum sizes and the minimum sizes are determined for the first frame image 161 and the second frame image 162 depicted in FIG. 9B. The first frame image 161 is one example of the rectangular first region instruction image and the rectangle is one example of the first shape. The second frame image 162 is one example of the circular second region instruction image and the circle is one example of the second shape. The process of S41 is one example of the size determination process.

The maximum size of the first frame image 161 is, for example, the size on the occasion of the first frame image 161 first contacting with the foreground area when having been expanded while keeping the aspect ratio centered at the touch position of the input medium in the peek operation. Further, the minimum size of the first frame image 161 is, for example, the smallest value of the minimum size corresponding to the stamp image data denoting the rectangular stamp image, among the stamp image data stored in the memory 62 or the undepicted server.

The maximum size of the second frame image 162 is, for example, the size on the occasion of the second frame image 162 first contacting with the foreground area when its diameter is expanded while keeping the true circle centered at the touch position of the input medium in the peek operation. Further, the minimum size of the second frame image 162 is, for example, the smallest value of the minimum size corresponding to the stamp image data denoting the circular stamp image, among the stamp image data stored in the memory 62 or the undepicted server.

Figure 9B:
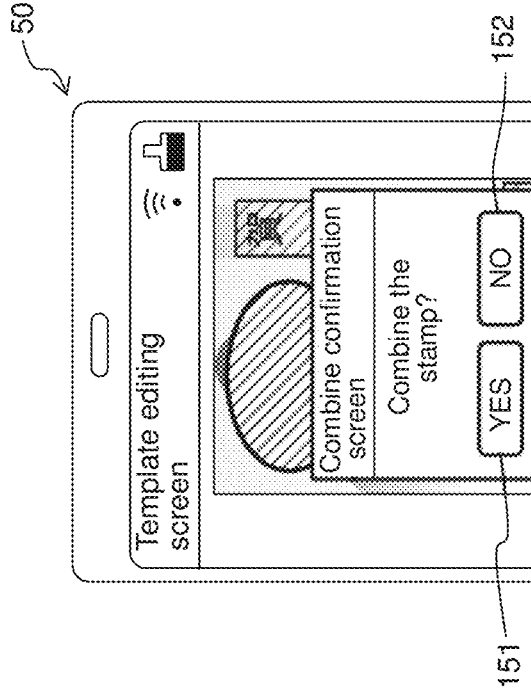
FIG. 9B depicts the template editing screen in which other frame images are displayed.

Next, the terminal apparatus program 65 displays the frame images 161 and 162 superimposed on the template image 121, as depicted in FIG. 9B, and periodically expands and contracts the frame images 161 and 162 respectively between the maximum size and the minimum size (S42). That is, the frame images 161 and 162 are expanded and contracted in terms of area, respectively, between the maximum size and the minimum size while keeping the shape.

Further, the terminal apparatus program 65 hides the first frame image 161 and further expands the second frame image 162 in accordance with such an event, for example, that the first frame image 161 has reached the maximum size but the second frame image 162 has not yet reached the maximum size. Hereinbelow, the term "intermediate size" will be used to refer to the size of the second frame image 162 at the timing of hiding the first frame image 161. Then, the terminal apparatus program 65 redisplays the first frame image 161 at the timing of contracting the second frame image 162 having reached the maximum size to the intermediate size, and then contracts the first frame image 161 and the second frame image 162 respectively. The process of S42 is one example of the second display process.

Next, the terminal apparatus program 65 moves the display positions of the frame images 161 and 162 following the input medium (S44) in accordance with the event that the operation unit 54 has detected the input medium in the peek operation having moved on the display surface (S43: Drag). Then, the terminal apparatus program 65 determines the maximum sizes and the minimum sizes for the frame images 161 and 162 at the touch position of the moved input medium, and periodically expands and contracts the frame images 161 and 162 between the maximum sizes and the minimum sizes (S41 and S42). The process of S44 is one example of the moving process. Further, the processes of S41 to S44 are different from those of S24 to S27 in that the plurality of frame images 161 and 162 are the processing targets. The contents of concrete processing of the respective frame images 161 and 162 may be the same as the steps S24 to S27.

Next, the terminal apparatus program 65 determines the position and shape of the designated region (S45) in accordance with such an event that the operation unit 54 has detected the peek operation detected in S15 having changed to a pop operation (S43: Pop). In more detail, the terminal apparatus program 65 causes the memory 62 to temporality store information denoting the positions and areas of the frame images 161 and 162 being displayed from the timing at which the operation unit 54 detected the peek operation having changed to the pop operation. In this embodiment, supposing that the pop operation is detected in the timing of the first frame image 161 being hidden while the second frame image 162 being displayed, the following processes will be explained.

Next, the terminal apparatus program 65 extracts the stamp image data denoting the stamp image in the contour shape corresponding to the shape of the second frame image 162 being displayed from the timing at which the pop operation was detected, among the stamp image data stored in the memory 62 or the undepicted server (S46). That is, in this embodiment, only such stamp image data are extracted as denoting the stamp images in the circular contour shape. On the other hand, if the pop operation is detected in the timing of both the frame images 161 and 162 being displayed, then the terminal apparatus program 65 extracts the stamp image data denoting the stamp images in the rectangular or circular contour shape. That is, the pop operation on the template editing screen with the displayed frame images is one example of the user's operation to designate, via the operation unit 54, the contour shapes corresponding to the frame image shapes in display. The process of S46 is one example of the extraction process.

Figure 10B:
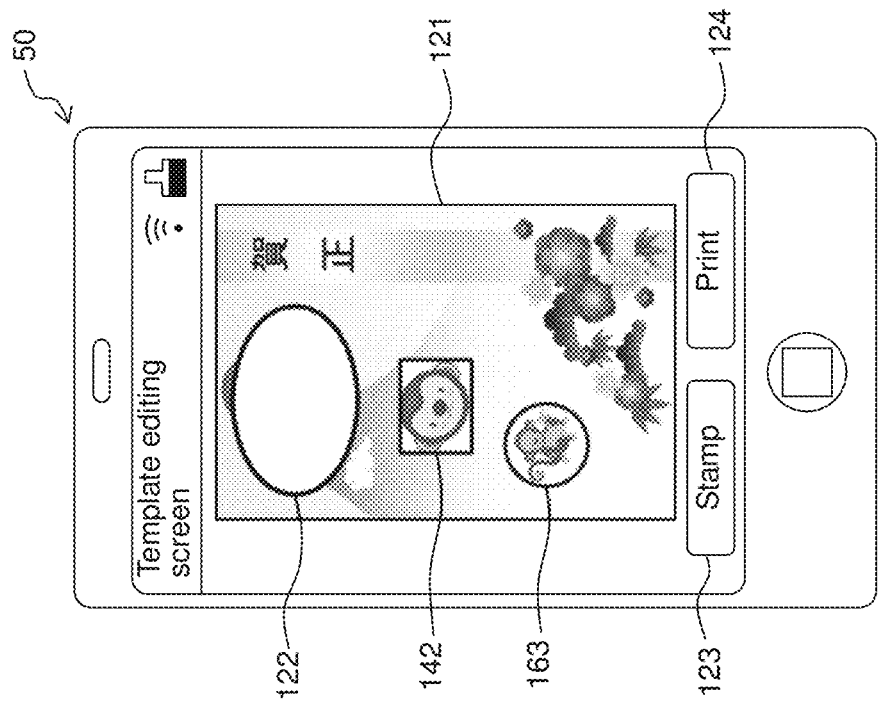
FIG. 10B depicts the template editing screen where the stamp images are combined into the template image.
Figure 10A:
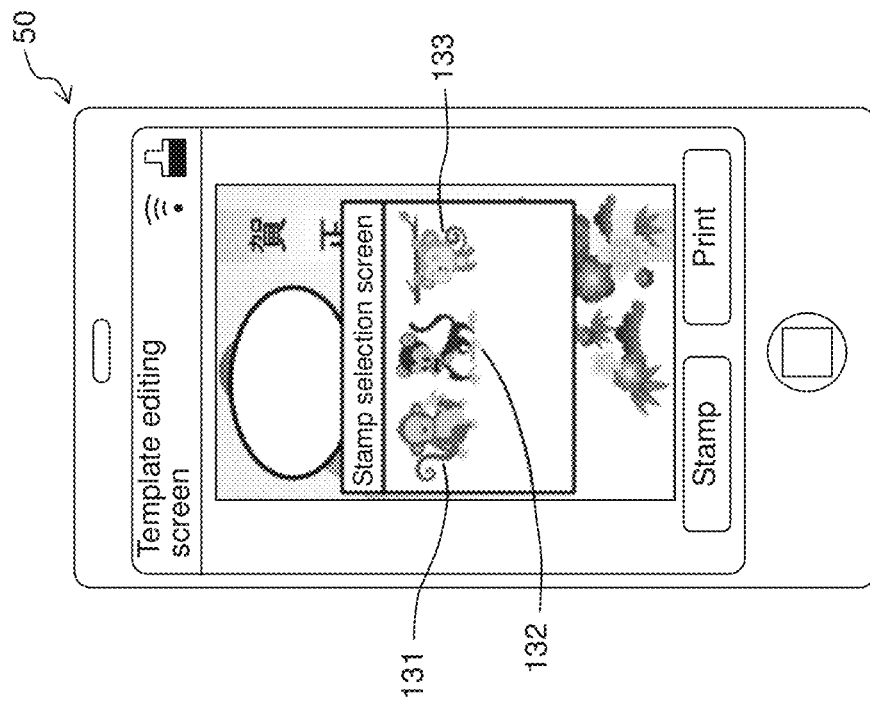
FIG. 10A depicts the stamp selection screen superimposed on the template editing screen.

Then, the terminal apparatus program 65 causes the display 53 to display a stamp selection screen depicted in FIG. 10A (S47). The stamp selection screen depicted in FIG. 10A may be the same as the stamp selection screen depicted in FIG. 7A. However, the stamp selection screen depicted in FIG. 10A includes the stamp icons 131, 132 and 133 corresponding to the stamp image data extracted in S46, but does not include the stamp icon 134 corresponding to the stamp image data not extracted in S46. The process of S47 is one example of the third display process. Then, the terminal apparatus program 65 accepts the user's operation on the stamp selection screen via the operation unit 54 (S48).

Next, the terminal apparatus program 65 combines the stamp image 163 represented by the stamp image data corresponding to the designated stamp icon 131 into the designated region determined in S45, as depicted in FIG. 10B (S49), in accordance with such an event, for example, that the operation unit 54 has detected a tap operation on the position of the stamp icon 131 (S48: Yes). In more detail, the terminal apparatus program 65 expands or contracts the stamp image 163 to such a size as the area of the second frame image 162 temporarily stored in the step of S45, and combines the same into the template image 121 at the position of the second frame image 162 temporarily stored in the step of S45. The process of S49 is one example of the combine process, and the processes of S46 to S49 are one example of the editing process.

Then, the terminal apparatus program 65 sorts the combined stamp image 163 into the foreground area (S13) and, as depicted in FIG. 10B, causes the display 53 to display the template image 121 with the newly combined stamp image 163 (S14). On the other hand, the terminal apparatus program 65 carries out the processes from S13, returning to FIG. 2, without carrying out the processes of S45 to S49, in accordance with the event that the operation unit 54 has detected the input medium in the peek operation having been separate from the display surface (S43: Separate). Further, the terminal apparatus program 65 may cause the display 53 to display a screen inquiring whether or not to carry out the processes of S45 to S49 and, following the user's instruction accepted via the operation unit 54, determine whether or not to carry out the processes of S45 to S49.

Figure 5:
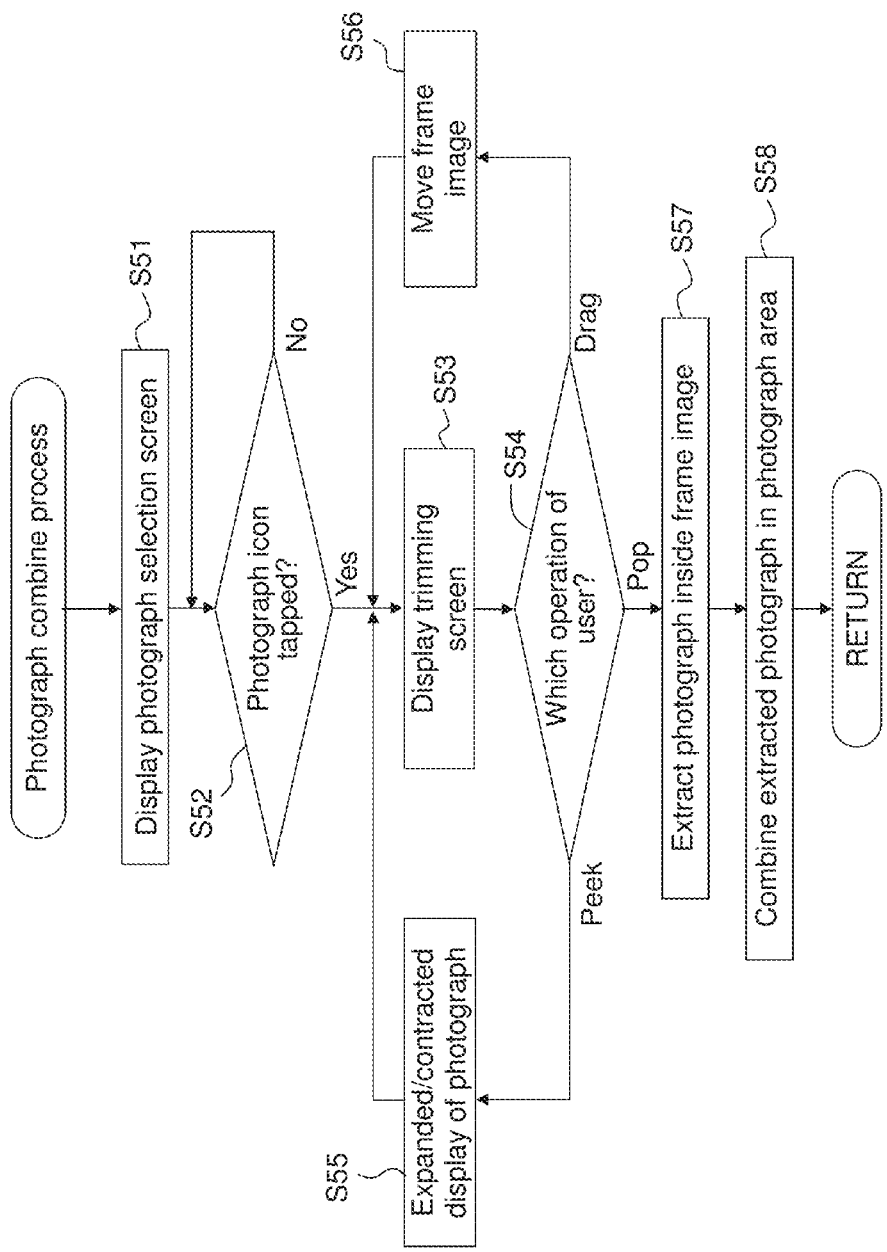
FIG. 5 is a flowchart of a photograph combine process.

Further, the terminal apparatus program 65 carries out a photograph combine process (S17) in accordance with such an event that the operation unit 54 has detected a tap operation on the position of the photograph frame image 122 depicted in FIG. 10B (S15: Photograph frame image). The photograph combine process serves to combine part of the photograph designated by the user into the photograph area indicated by the photograph frame image 122. Referring to FIG. 5, the photograph combine process will be explained in detail. However, the explanation will focus on different aspects but be omitted for the details of the common aspects to the stamp combine process.

<The Photograph Combine Process>

First, the terminal apparatus program 65 causes the display 53 to display a photograph selection screen depicted in FIG. 11A (S51). The photograph selection screen serves to urge selection of a photograph to combine into the photograph area. The photograph selection screen includes photograph icons 171, 172, 173, 174, 175 and 176. The photograph icons 171 to 176 correspond to the photograph data stored in the memory 62 or the undepicted server. Then, the terminal apparatus program 65 accepts the user's operation on the photograph selection screen via the operation unit 54 (S52).

Next, the terminal apparatus program 65 acquires, from the memory 62 or the undepicted server, the photograph data corresponding to the designated photograph icon 175 in accordance with such an event, for example, that the operation unit 54 has detected a tap operation on the position of the photograph icon 175 (S52: Yes). Next, the terminal apparatus program 65 causes the display 53 to display a photograph extraction screen (a trimming screen) depicted in FIG. 11B (S53). The process of S53 is one example of the first display process. Then, the terminal apparatus program 65 accepts the user's operation on the photograph extraction screen via the operation unit 54 (S54).

The photograph extraction screen serves to urge designation of such a part of the photograph to combine into the photograph area as represented by the photograph data acquired in S52. The photograph extraction screen includes a photograph image 181 represented by the photograph data acquired in S52, and a frame image 182 superimposed on the photograph image 181. The photograph image 181 is one example of the edit-target image, while the frame image 182 is one example of the region instruction image indicating the designated region on the photograph image 181. That is, the designated region is such a region of the photograph image 181 as inside the frame image 182. The frame image 182 is a frame type image corresponding to the shape and area of the photograph frame image 122. The shape and area of the photograph frame image 122 may be represented, for example, by metadata corresponding to the template image data.

Next, the terminal apparatus program 65 periodically expands and contracts the photograph image 181 (S55) in accordance with such an event that the operation unit 54 has detected a peek operation on the position of the frame image 182 (S54: Peek). That is, for example, the photograph image 181 is expanded gradually until reaching the maximum size depicted with the dashed line in FIG. 12A. Thereafter, after the maximum size is reached, the photograph image 181 is contracted gradually. Then, after the minimum size is reached, the photograph image 181 is expanded gradually again. In other words, the terminal apparatus program 65 changes, over the passage of time, the area of the photograph image 181 included inside the frame image 182. This process is one example of the process to change, over the passage of time, at least one of the area and the shape of the designated region indicated by the frame image 182. The process of S55 is one example of the second display process.

Next, the terminal apparatus program 65 moves the display position of the frame image 182 following the input medium (S56) in accordance with the event that the operation unit 54 has detected the input medium in the peek operation having moved on the display surface (S54: Drag). The process of S56 is one example of the moving process, and may be the same as S27. As another example, the terminal apparatus program 65 may move the display position of the photograph image 181 following the input medium while fixing the position of the frame image 182 as it is. In this case, the area of the photograph image 181 coming beyond or outside the display 53 may be hidden. Then, the terminal apparatus program 65 extracts the area of the photograph image 181 included inside the frame image 182 (S57) in accordance with the event that the operation unit 54 has detected the peek operation detected in S54 having changed to the pop operation (S54: Pop). The process of S57 is one example of the editing process.

Then, as depicted in FIG. 12B, the terminal apparatus program 65 combines the photograph image 183 extracted in S57 into the template image 121 in the photograph area indicated by the photograph frame image 122 (S58). The process of S58 is one example of the combine process. Further, the terminal apparatus program 65 sorts the combined photograph image 183 into the foreground area (S13) and, as depicted in FIG. 12B, causes the display 53 to display the template image 121 with the combined photograph image 183 (S14).

Next, the terminal apparatus program 65 sends print instruction information to the multifunction peripheral 10 via the communication interface 55 (S18), in accordance with such an event that the operation unit 54 has detected a tap operation on the position of the "Print" icon 124 of FIG. 12B (S15: Print icon). The print instruction information serves to instruct carrying out a print operation to record the edited template image 121 on the back side of the New Year's card. The print instruction information includes the template image data denoting the template image 121 with the combined stamp images 142 and 163 and photograph image 183. On the other hand, although illustration is omitted, the apparatus program 35 of the multifunction printer 10 receives the print instruction information from the terminal apparatus 50 via the communication interface 25. Then, the apparatus program 35 causes the printer 11 to carry out the print operation following the print instruction information.

Further, the template editing screen may include an undepicted "Save" icon. The "Save" icon corresponds to the instruction to save the template image data denoting the edited template image 121. Then, the terminal apparatus program 65 may cause the memory 62 or the undepicted server to store the template image data denoting the template image 121 with the combined stamp images 142 and 163 and photograph image 183 in accordance with such an event that the operation unit 54 has detected a tap operation on the position of the "Save" icon.

Further, although illustration is omitted, the terminal apparatus program 65 may, for example, edit the stamp images 142 and 163 in accordance with such an event that the operation unit 54 has detected a touch operation on the positions of the stamp images 142 and 163. The word "edit" mentioned here may be such an operation as, for example, moving or rotating the stamp images 142 and 163, changing their areas, or the like.

As one example, the terminal apparatus program 65 may move the display position of the stamp image 142 following the input medium in accordance with such an event as having accepted, via the operation unit 54, a touch operation on the position of the stamp image 142 and the moving of the input medium during the touch operation. Further, the terminal apparatus program 65 may display an editing icon around the stamp image 142 in accordance with the event of having accepted, via the operation unit 54, a tap operation on the position of the stamp image 142. Then, the terminal apparatus program 65 may edit the stamp image 142 following the operation on the editing icon.

As another example, the terminal apparatus program 65 may display a frame image corresponding to the contour shape of the stamp image 163 in the position of the stamp image 163 superimposed on the template image 121 in accordance with such an event of having accepted, via the operation unit 54, a peek operation on the position of the stamp image 163. Then, the terminal apparatus program 65 may carry out processes equivalent to those of S24 to S27, following the operation detected by the operation unit 54. Further, the terminal apparatus program 65 may combine, into the template image 121, the stamp image corresponding to the position and area of the frame image in the pop operation, instead of the stamp image 163 before the peek operation, in accordance with the event that the operation unit 54 has detected the peek operation having changed to the pop operation.

[Effects of this Embodiment]

According to the above embodiment, the peek operation leads to displaying the frame images 141, 161, 162 and 182 superimposed on the edit-target image while the pop operation leads to editing the edit-target image within the designated region. The word "editing" mentioned here may include, for example, combining other images into the edit-target image in the designated region, extracting an area included in the designated region from the edit-target image, as well as deleting an image combined in the designated region, changing the background color of the designated region, and the like. By virtue of this, with the terminal apparatus 50 having the touch sensor, it is possible to realize editing the edit-target image at a desired position with only a few user's operations.

Further, according to the above embodiment, because of expanding the frame images 141, 161 and 162 so as not to overlap with the foreground area, it is possible to restrain a stamp image, which is newly combined into the template image, from overlapping with the foreground area. However, it is also possible to combine a stamp image into the template image in a position overlapping with the foreground area. That is, the terminal apparatus program 65 may set the maximum sizes for the frame images 141, 161 and 162 at predetermined values in S24 and S41.

Further, the terminal apparatus program 65 may accept, via the operation unit 54, the user's operation designating such a foreground area restraining the overlap of a stamp image as for the foreground area specified in S13. Then, the terminal apparatus program 65 may set the maximum sizes for the frame images 141, 161 and 162 in S24 and S41 such that the designated region may not overlap with the foreground area designated by the user.

Further, according to the background area peek process of the above embodiment, because the plurality of frame images 161 and 162 are displayed simultaneously, it is easier to imagine the layout when the stamp image is combined into the designated region. By virtue of this, it becomes simpler to combine the stamp image into the template image. However, the aspect of displaying the plurality of frame images 161 and 162 is not limited to the example described above but, for example, may let the frame images 161 and 162 be displayed in order.

In more detail, the terminal apparatus program 65 may expand the first frame image 161 superimposed on the template image 121 up to the maximum size, contract the same down to the minimum size, and then expand the same to the original size. Next, instead of the first frame image 161, the terminal apparatus program 65 may expand the second frame image 162 superimposed on the template image 121 up to the maximum size, contract the same down to the minimum size, and then expand the same to the original size.

Further, according to the background area peek process of the above embodiment, by carrying out the pop operation in the timing of displaying the frame image in a desired shape, only the stamp images corresponding to the shape of that frame image are extracted. By virtue of this, because the number of the stamp icons included in the stamp selection screen decreases, it is possible to realize combining the stamp image into the template image through a simpler operation. However, the method of narrowing down the shape of the stamp images to extract is not limited to the example described above.

Further, according to the stamp combine process of the above embodiment, the user is inquired about whether or not to combine the stamp image via the combine confirmation screen in accordance with the input medium having been separate. By virtue of this, even if the input medium in moving is mistakenly separate from the display surface, because there is no need to redo the operation all over again, the operation becomes simpler to combine a small image into the edit-target image.

Further, as in the above embodiment, as the process of combining the stamp image into the template image, the frame image 141 may be used to designate the designated region, as depicted in FIG. 3, after the stamp image is designated via the stamp selection screen, or the stamp image may be designated via the stamp selection screen, as depicted in FIG. 4, after the frame images 161 and 162 are used to designate the designated region. In this manner, by providing a plurality of procedures for obtaining the same result, it is possible to edit the image as the user pleases.

Further, according to the photograph combine process of the above embodiment, the photograph image 181 is expanded and contracted with the superimposed frame image 182 of the fixed shape and area. Then, by carrying out the pop operation at the timing of the frame image 182 having contained the area to be desirably extracted from the photograph image 181, it is possible to extract the desired area through a simple operation.

Further, according to the above embodiment, by combining the peek operation, the slide operation and the pop operation, a series of operations are realized to edit the edit-target image without separating the input medium from the display surface. By virtue of this, the trouble of a complicated operation for editing the edit-target image is reduced, compared with the case of repetitively letting the input medium touch and separate from the display surface. However, without being limited to the combination of the peek operation, pop operation and slide operation, it is possible, for example, to detect the long touch operation instead of the peek operation, the separation of the input medium instead of the pop operation, and the flick operation instead of the slide operation. In such cases, it is possible to omit the pressure sensor 54A.

Further, the above explanation was made on the example of realizing each process carried out by the controller of the present teaching by letting the CPUs 31 and 61 carry out various programs stored in the memories 32 and 62 in the multifunction peripheral 10 and the terminal apparatus 50 of the above embodiment. However, the controller is not limited to the above configuration but may be realized partially or entirely by hardware such as integrated circuits and the like.

Further, it is possible to realize the present teaching not only as the multifunction peripheral 10 and the terminal apparatus 50 but also as a program for the multifunction peripheral 10 and the terminal apparatus 50 to carry out the processes. Then, the program may be provided in such a manner as recorded in a non-transitory recording medium. The non-transitory recording medium may include a CD-ROM, a DVD-ROM, and the like, as well as a memory built in a server connectable to the multifunction peripheral 10 and the terminal apparatus 50 via the communication network 101. Then, the program stored in the memory of the server may be transmitted as information or signals denoting that program via the communication network 101 such as the Internet or the like.

What is claimed is:

1. A non-transitory computer-readable medium storing programs executable by a terminal apparatus provided with a display having a display surface and a touch sensor arranged on the display surface to detect touch operations by an input medium, the programs, when executed by a processor, causing the terminal apparatus to execute:

displaying an edit-target image on the display surface;

determining whether a first touch operation or a second touch operation is operated on the display surface, based on a detection of the touch sensor;

displaying a region instruction image on the display surface while superimposing the region instruction image on the edit-target image, in response to a determination that the first touch operation is operated on the display surface at a position on the edit-target image, the region instruction image indicating a designated region on the edit-target image; and editing the designated region of the edit-target image, in response to a determination that the first touch operation is changed to the second touch operation on the display surface at the position on the edit-target image, wherein the first touch operation and the second touch operation are a series of operations operated without separating the input medium from the display surface.

2. The medium according to claim 1, wherein the programs, when executed by the processor, cause the terminal apparatus to further execute moving the region instruction image to follow the input medium, in response to movement of the input medium in the first touch operation on the display surface detected by the touch sensor.

3. The medium according to claim 2, wherein when displaying the region instruction image on the display surface while superimposing the region instruction image on the edit-target image, the programs, when executed by the processor, cause the terminal apparatus to change at least one of an area and a shape of the designated region indicated by the region instruction image, over time.

4. The medium according to claim 3, wherein the programs, when executed by the processor, cause the terminal apparatus to further execute:

dividing the edit-target image into a foreground area and a background area; and determining the maximum size and the minimum size for the region instruction image, in response to the first touch operation on the background area, the maximum size being a size for the region instruction image to first contact with the foreground area in a case where the region instruction image is expanded with a touch position of the input medium in the first touch operation being a center, and when displaying the region instruction image on the display surface while superimposing the region instruction image on the edit-target image, the programs, when executed by the processor, cause the terminal apparatus to periodically expand and contract the region instruction image between the determined maximum size and the determined minimum size.

5. The medium according to claim 4, wherein the terminal apparatus is further provided with a memory, and when editing the designated region of the edit-target image, the programs, when executed by the processor, cause the terminal apparatus to execute:

extracting at least one small image placeable in the designated region from small images stored in the memory;

displaying, on the display surface, a list of the at least one small image extracted; and combining a small image with the designated region of the edit-target image, in response to a tap operation on the small image included in the list, detected by the touch sensor.

6. The medium according to claim 5, wherein when extracting the at least one small image placeable in the designated region from small images stored in the memory, the programs, when executed by the processor, cause the terminal apparatus to extract the at least one small image having a contour shape designated via the touch sensor from the small images having a plurality of contour shapes.

7. The medium according to claim 6, wherein the region instruction image is a frame type image corresponding to the contour shape of the at least one small image, the region instruction image is displayed as a first region instruction image having a first shape and a second region instruction image having a second shape, and the programs, when executed by the processor, cause the terminal apparatus to execute:

determining the maximum size and the minimum size for each of the first region instruction image and the second region instruction image, and expanding and contracting periodically the first region instruction image and the second region instruction image while superimposing the first region instruction image and the second region instruction image on the edit-target image.

8. The medium according to claim 7, wherein the programs, when executed by the processor, cause the terminal apparatus to execute:

hiding the first region instruction image and further expanding the second region instruction image in the second display process, in response to the first region instruction image reaching the maximum size and the second region instruction image not reaching the maximum size; and extracting the at least one small image having the contour shape corresponding to the second region instruction image, in response to the change of the first touch operation to the second touch operation while the second region instruction image is displayed and the first region instruction is not displayed.

9. The medium according to claim 4, wherein the terminal apparatus is further provided with a memory, the programs, when executed by the processor, cause the terminal apparatus to execute displaying a list screen containing a list of small images stored in the memory, in accordance with such an event that the touch sensor has detected the first touch operation on a small image included in the list screen and the input medium in the first touch operation moving out of the list screen, the programs, when executed by the processor, cause the terminal apparatus to display the region instruction image corresponding to a contour shape of the small image to the display surface in the second display process while superimposing the region instruction image on the edit-target image, and when editing the designated region of the edit-target image, the programs, when executed by the processor, cause the terminal apparatus to combine the small image expanded or contracted to the size of the designated region with the designated region of the edit-target image.

10. The medium according to claim 9, wherein the programs, when executed by the processor, cause the terminal apparatus to execute displaying an inquiry screen on the display surface to inquire a user whether editing the designated region of the edit-target image is to be executed, in response to a separation of the input medium in the first touch operation from the display surface detected by the touch sensor when displaying the region instruction image on the display surface while superimposing the region instruction image on the edit-target image, and the programs, when executed by the processor, cause the terminal apparatus to execute editing the designated region of the edit-target image in response to a touch operation on the inquiry screen, detected by the touch sensor, to instruct execution of editing the designated region of the edit-target image.

11. A terminal apparatus comprising:

a display having a display surface;

a touch sensor arranged on the display surface to detect touch operations by an input medium; and a controller configured to execute:

displaying an edit-target image on the display surface;

determining whether a first touch operation or a second touch operation is operated on the display surface, based on a detection of the touch sensor;

displaying a region instruction image on the display surface while superimposing the region instruction image on the edit-target image, in response to a determination that the first touch operation is operated on the display surface at a position on the edit-target image, the region instruction image indicating a designated region on the edit-target image; and editing the designated region of the edit-target image, in response to a determination that the first touch operation is changed to the second touch operation on the display surface at the position on the edit-target image, wherein the first touch operation and the second touch operation are a series of operations operated without separating the input medium from the display surface.

12. A non-transitory computer-readable medium storing programs executable by a terminal apparatus provided with a display having a display surface and a touch sensor arranged on the display surface to detect touch operations, the programs, when executed by a processor, causing the terminal apparatus to execute:

displaying an edit-target image on the display surface;

determining whether a first touch operation or a second touch operation is operated on the display surface, based on a detection of the touch sensor;

displaying a region instruction image on the display surface while superimposing the region instruction image on the edit-target image, and periodically expanding and contracting the edit-target image, in response to a determination that the first touch operation is operated on the display surface at a position on the edit-target image, the region instruction image indicating a designated region on the edit-target image; and editing the designated region of the edit-target image by extracting an image within the designated region from the edit-target image, in response to a determination that the first touch operation is changed to the second touch operation on the display surface at the position on the edit-target image.

13. A non-transitory computer-readable medium storing programs executable by a terminal apparatus provided with a display having a display surface and a touch sensor arranged on the display surface to detect touch operations, the touch sensor including a pressure sensor configured to detect pressure applied by an input medium and a position sensor configured to detect a position where the pressure is applied by the input medium, the programs, when executed by a processor, causing the terminal apparatus to execute:

displaying an edit-target image on the display surface;

determining whether a first touch operation or a second touch operation is operated on the display surface, based on a detection of the touch sensor;

displaying a region instruction image on the display surface while superimposing the region instruction image on the edit-target image, in response to a determination that the first touch operation is operated on the display surface at a position on the edit-target image, the region instruction image indicating a designated region on the edit-target image; and editing the designated region of the edit-target image, in response to a determination that the first touch operation is changed to the second touch operation on the display surface at the position on the edit-target image, wherein the touch sensor is configured to detect the first touch operation at the position, if the pressure sensor detects the pressure lower than a threshold value and the position sensor detects the position to which the pressure is applied, and the touch sensor is configured to detect the second touch operation at the position, if the pressure sensor detects the pressure not lower than the threshold value and the position sensor detects the position to which the pressure is applied.

* * * * *